(12) United States Patent
Levadnyi et al.

(10) Patent No.: US 10,604,348 B1
(45) Date of Patent: Mar. 31, 2020

(54) CONVEYOR PULLEY, BEARING, AND BEARING PROTECTOR APPARATUS AND METHODS

(71) Applicants: Ihor Levadnyi, Zhytomyr (UA); Vitalii Levadnyi, West Hollywood, CA (US)

(72) Inventors: Ihor Levadnyi, Zhytomyr (UA); Vitalii Levadnyi, West Hollywood, CA (US)

( * ) Notice: Subject to any disclaimer, the term of this patent is extended or adjusted under 35 U.S.C. 154(b) by 19 days.

(21) Appl. No.: 16/010,504

(22) Filed: Jun. 17, 2018

(51) Int. Cl.
*F16C 17/02* (2006.01)
*B65G 23/06* (2006.01)
*F16C 19/36* (2006.01)

(52) U.S. Cl.
CPC ............ *B65G 23/06* (2013.01); *F16C 19/361* (2013.01); *F16C 2326/58* (2013.01)

(58) Field of Classification Search
CPC ........ F16C 13/00; F16C 13/006; F16C 13/02; F16C 17/02; F16C 33/103; F16C 33/104; F16C 33/20; F16C 33/726; F16C 33/74; F16C 2326/58; F16C 2361/63; F16J 15/3463
See application file for complete search history.

(56) References Cited

U.S. PATENT DOCUMENTS

| 3,947,076 A | * | 3/1976 | Lindeman | ............... D06F 58/08 384/279 |
| 4,685,184 A | * | 8/1987 | Satkamp | ............... B23P 15/003 29/447 |

FOREIGN PATENT DOCUMENTS

| DE | 10023452 A1 | * | 11/2001 | ............ F16C 13/006 |
| GB | 2239908 A | * | 7/1991 | ................ B66F 9/08 |

\* cited by examiner

*Primary Examiner* — Phillip A Johnson
(74) *Attorney, Agent, or Firm* — Vadim Polonichko

(57) ABSTRACT

Conveyer pulley with improved performance characteristics reduced metal use, lower labor use manufacture, assembly and maintenance. The pulley includes a tubular housing, an axle pre-fitted with disks supports, two plastic endcaps press-fitted into the housing. Two self-lubricating plastic bearings with integrated bearing protectors are fitted onto the axle and into the end caps and are being kept in place by two retaining rings. Protector element of the bearing is fabricated from felt that is impregnated with a lubrication fluid. Inner grooves of the bearings may be packed with consistent lubricant.

21 Claims, 12 Drawing Sheets

CONVEYOR PULLEY, BEARING, AND BEARING PROTECTOR APPARATUS AND METHODS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

The present disclosure relates generally to the field of engineering, improvement of pulleys for belt conveyers that operate in the challenging environment where the dust content is increased or heavy (ore mining, metallurgy, coal-mining industry, agriculture, building industry, etc.) and more particularly in one exemplary aspect to conveyor pulley apparatus, pulley bearings, bearing seal components and methods for manufacturing thereof.

Description of Related Art

The invention relates to the field of engineering, improvement of pulleys for belt conveyers that operate in the challenging environment where the dust content is increased or heavy (ore mining, metallurgy, coal-mining industry, agriculture, building industry, and/or other applications). When operating conveyors in dusty environments, dust and/or particular matter may enter the bearing and damage/ and or destroy the pulley. Some existing configuration of protection of the bearing assembly from dust and abrasive include use of labyrinth seals, protection covers of various types, installation of additional lip seals and gaskets, use of enclosed bearings. These are not always adequate as air flow due to thermal expansion and contraction during bearing operation may suck dust particles through a seal into the bearing. It may be desirable to provide for an improved bearing design with greater level of sealing and protection from dust and/or particulate matter and extended service life.

SUMMARY OF THE DISCLOSURE

The present disclosure satisfies the foregoing needs by providing, inter alia, apparatus and methods for a construction of a conveyer pulley with fewer components, reduced weight, and reduced complexity of fabrication.

One aspect of the disclosure relates to a bearing protection assembly for use with a radial bearing. In one implementation, the bearing protection assembly includes a solid portion having an outer surface characterized by a first outer diameter and an aperture characterized by a first inner diameter; and an air-permeable ring having a second outer diameter configured equal the first inner diameter, the ring configured to be disposed inside the aperture such that bearing protection assembly is configured to be installed on an axle proximate the bearing; is characterized by a bearing-facing side that configured to face the bearing and a distal side; and the air-permeable ring is composed of an air-permeable material configured to allow air passage between the distal side and the bearing-facing side.

In some implementation, the air-permeable material is constructed from felt that is impregnated with lubricating fluid.

In another implementation, the solid portion is characterized by a first thickness and a second thickness configured smaller than the first thickness.

In some implementations, the solid portion includes a slanted chamfer disposed on the bearing facing side and extending outwards such that thickness of the solid portion closer the outer surface is greater than thickness proximate the aperture.

In a second aspect of the disclosure a self-lubricating bearing apparatus is disclosed. In one implementations, the apparatus includes a housing including a cylindrical body characterized by an outside diameter and having an inner cylindrical cavity characterized by an inside diameter, the cylindrical body characterized; an aperture formed by a shoulder extending inward from a wall of the inner cylindrical cavity around circumference of the cavity, the shoulder disposed proximate the inward side; a cavity formed in the shoulder and configured to receive a finger; a radial channel formed along of the wall of the inner cylindrical cavity, the radial channel disposed distant from the inward side; and a bearing protection assembly including: a seal body having an outer surface and an inner cylindrical opening characterized by an opening dimension, the seal body configured to be disposed coaxially with the housing; the finger extending from the outer surface and configured to match shape of the cavity, the finger disposed proximate the internal side; one or more linear grooves formed along a wall of the inner cylindrical opening; and an air-permeable ring disposed inside the seal body, the ring having an ring inner diameter configured no smaller than diameter of the inner aperture.

In some implementations the seal body is configured to be inserted axially into the inner cavity via a press-fit operation, the shoulder is configured to arrest axial movement of the seal body.

In some implementations an outer diameter of the seal body is configured to match the inside diameter of the cylindrical body such that to form a slide in fit.

In some implementations the cavity and the finger configured to form a keyed joint configured to prevent relative rotation between the seal body and the cylindrical body.

In a third aspect of the disclosure, a pulley assembly is disclosed. In one implementation the pulley assembly includes a cylindrical housing, characterized by a first inner diameter and having a first end and a second end opposite from the first end; an axle characterized by an axle diameter and two self-lubricating bearing apparatus, one disposed proximate the first end and another disposed proximate the second end of the housing, each bearing apparatus including: a bearing body characterized by an outside diameter configured no smaller than the first inner diameter, and having an outer flange formed on an exterior side of the bearing body, the flange characterized by an outer flange diameter that is greater than the first inner diameter; the flange extending outwards in a direction perpendicular to that of the axle, the bearing body having an inner cavity and a radial groove firmed around a circumference of the inner cavity, the groove disposed proximate the exterior side; a bearing protector disposed in the inner cavity, the bearing protector including: a plastic portion having an inner cylindrical opening characterized by an opening dimension that is configured to be no smaller than the axle diameter, the inner opening configured to receive one end of the axle, the plastic portion characterized by an axial dimension, the plastic portion having one or more linear channels disposed on a wall of the inner opening and each of the linear channels extending along at least a portion of the axial dimension.

In some implementations the bearing body includes a shoulder disposed at inner side of the inner cavity, the shoulder configured to limit axial insertion of the bearing protector into the inner cavity; and the flange is configured to arrest axial movement of the bearing body into the cylindrical housing.

In a fourth aspect of the disclosure, methods of manufacturing the bearing protector are disclosed. In one implementation, the bearing protector is manufactured by placing a felt ring into a mold, and use vertical molding machines and injection-molding machines pressure to produce plastic casing.

In a fifth aspect of the disclosure, methods of manufacturing improved pulley assemblies including self-lubricating bearings are disclosed.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

FIG. 6A is an exploded perspective view; FIG. 6B is a perspective view of the pulley assembly of FIG. 6A; FIG. 6C illustrates an enlarged portion of the pulley assembly of FIG. 6B; and FIG. 6D is a section view of an end portion of the pulley assembly of FIGS. 6A-6C.

All Figures disclosed herein are © Copyright 2018. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation or implementation, but other implementations and implementations are possible by way of interchange of or combination with some or all of the described or illustrated elements. Wherever convenient, the same reference numbers will be used throughout the drawings to refer to same or like parts.

The present disclosure relates generally to the field of engineering, improvement of pulleys for belt conveyers that operate in the challenging environment where the dust content is increased or heavy (ore mining, metallurgy, coal-mining industry, agriculture, building industry, etc.) for the purpose of extension of their service life.

One of the objectives of the present disclosure is development of a conveyer pulley with improved performance characteristics, reduction in metal consumption and labor efforts during manufacture, assembly and maintenance of the said conveyer pulleys. In order to achieve this objective, the technical problem is further to lower requirements for quality of processing of parts, to increase ease of their installation and replacement, to enhance strength and ultimately, to increase the service life of the pulleys. Furthermore, the relevant objective is developing of a universal pulley, which can be used without significant modifications in the conveyers that use both flexible and rigid frames.

Figure 1A:
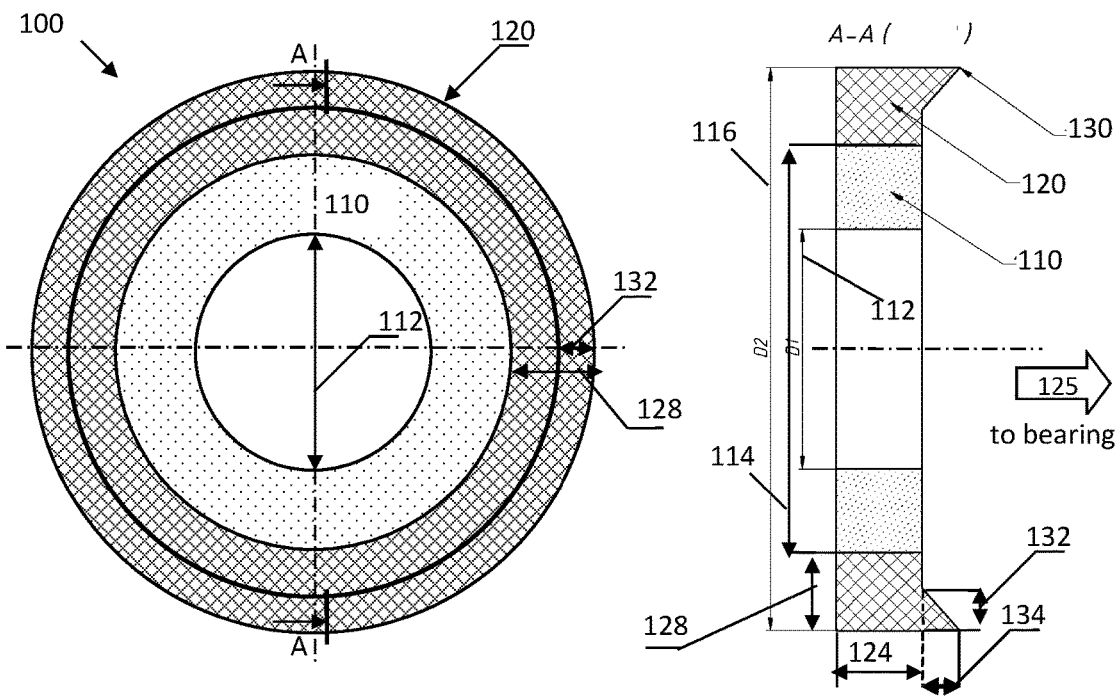
FIGS. 1A-1B illustrate some implementations of a bearing protector bearing protection assembly for use with pulley bearings.
Figure 1B:
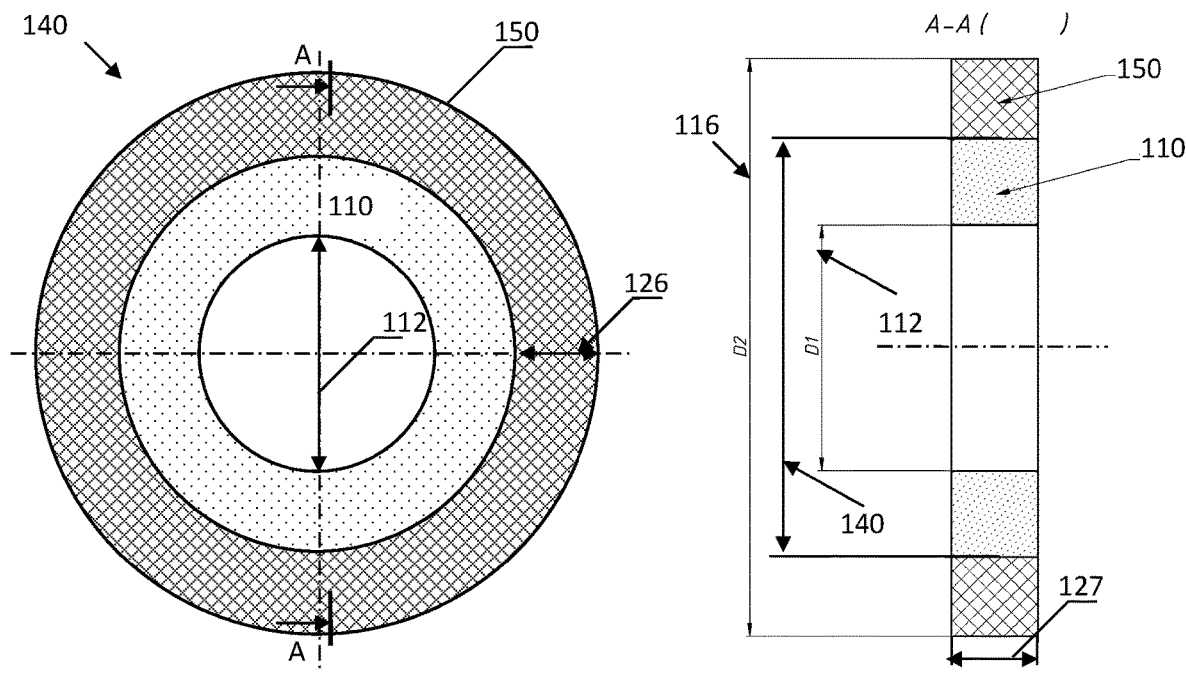

FIGS. 1A-1B illustrate some implementations of a bearing protector bearing protection assembly (also referred to as the bearing protector) for use with pulley bearings.

The bearing protection assembly shown and described herein, may enable protection of assemblies of antifriction bearings and/or friction bearings that operate in the challenging environment where the dust content is increased or heavy (ore mining, metallurgy, coal-mining industry, agriculture, building equipment, etc.). Presence of effective sealing devices is one of the conditions of performance capability and protective means for the bearing assemblies from dust and other particular matter.

FIG. 1A illustrates plan view and cross section view of one implementation of a bearing protection assembly used for protecting an internal bearing in a pulley assembly of e.g., a belt conveyor. One implementation of such pulley is shown and described below with respect to FIGS. 5A-5D.

The bearing protection assembly (also may be referred to as the bearing protector) 100 of FIG. 1A may include a plastic casing 120 and a protector component 110. The outside diameter 116 of the plastic casing may be configured in accordance with dimensions of the pulley bearing. For the purpose of firm fit, the outer surface may be made with slightly enlarged outer diameter 116 in order to form tension. By way of an illustration, when used with a bearing 304PP that may be characterized by an outside diameter of 52 mm, the diameter 116 may be selected at 52.2 mm; when used with a radial bearing 204PP, that may be characterized by an outside diameter of 47 mm, the diameter 116 may be selected at 47.2 mm. Such configuration may enable a firm fit of the bearing protection assembly 100 with the bearing.

Inner diameter 112 of the bearing protector 100 may be selected in accordance with the size of the pulley axle. In order to ensure full contact, the inner diameter 112 may be set smaller by 3-5% than the diameter of the axle. By way of an illustration, when used with a 20 mm diameter axle inner diameter 112 of the protector component 110 may be selected at 19 mm. Outer diameter 114 of the protector element may be selected at about 32 mm with the width 128 of the casing 120 about being about 7.5 mm. Thickness 124 of the protector component 110 and the flat portion of the casing 120 may be selected at 7 mm.

For the bearing assemblies where installation of a retaining ring is anticipated, the bearing protector 100 may be fabricated with shift of the protector element to outer side for their free mounting. That is, in order to reduce potential contact between the bearing (e.g., 502 in FIG. 5B) and/or bearing retaining ring (e.g., 503 in FIG. 5B) and the protector component 110, the casing 120 may be configured to include a chamfer that extends towards the bearing (e.g., in the direction indicated by arrow 125 in FIG. 1A). The chamfer 130 may be characterized by a width 132 and thickness 134. In the above example, dimensions 132 and 134 may be each selected at 3 mm. Use of the chamfer may advantageously simplify centering adjustment during installation of the bearing protector 100.

FIG. 1B illustrates one implementation of a bearing protection assembly used for protecting an internal bearing in a pulley assembly of e.g., a belt conveyor. The bearing protection assembly 140 of FIG. 1B includes a plastic casing 150 and the protector component 110. The casing 150 may be designed flat on both sides and be characterized by uniform thickness 124. The thickness 127 may be selected at about 7 mm for the outside diameter 116 of 47.2 mm. In one or more implementations, the bearing protection assembly 140 of FIG. 1B may be utilized to protect elements of an assembled pulley (e.g., pulley bearings) that may not be taken apart for cost and or practical reason. The bearing protection assembly 140 may be employed with an oil seal/gasket and provide protection for particles (e.g., in mining and/or agricultural applications). In the absence of the retaining ring, the bearing protection assembly 140 may be installed next to a bearing (502 in FIG. 5B).

The protector component 110 may be manufactured using a variety of materials, including but not limited to felt, technical felt, pressed wool felt, coarse gray wool felt, semi-coarse gray wool felt, felted cloth, synthetic nonwoven materials, and/or other air-permeable materials. In one or more implementations, density of the felt material may be in the range between 300 kg/m^3 to 700 kg/m^3, preferably 360 kg/m^3. Prior to installation and/or use, the protector component 110 is impregnated with a lubrication fluid, e.g., machine oil. Felt may be composed of wool that may be mixed with synthetic fibers in order to create sturdy, resilient felt for industrial use. Some felt materials may be made wholly from synthetic fibers. Felt materials may be produced as natural and/or synthetic fibers and/or fur are pressed together using heat, moisture, and/or pressure.

The casing 120, 150 in FIGS. 1A-1B, respectively, may be manufactured using a variety of engineering plastics, which comply with operational environment of the particular bearing assembly (oil-resistant, acid-resistant, alkali-resistant, and/or other requirement). When selecting a given material, maximum temperature of operation of the bearing assembly must be taken into consideration.

Vertical molding machines and injection-molding machines may be used for manufacture of the bearing protection assembly of the present disclosure, e.g., such as shown and described with respect to FIGS. 1A-1B. In one implementation, material for the protector component (e.g., 110) may be placed in an injection mold during manufacture. Specially designed elements of the mold keep the sealing material in place in order to obtain a firm joint with the plastic casing. Use of molding may enable to obtain a solid casting and stable sizes of an item in operation.

Bearing protector of the present disclosure, e.g., such as shown and described with respect to FIGS. 1A-1B have been demonstrated by prototypes and may provide the several advantages compared to existing designs. Typically, during operation of a pulley, the pulley may undergo heating during startup and/or operation and/or cooling during shutdown. Changes of atmospheric pressure and/or of ambient temperature may occur. These phenomena may cause flow of air across the bearing (e.g., outwards through the bearing towards the outside during hearing/startup; inward from the outside through the bearing during the cool down/shutdown). Even insignificant volumes of air may bring abrasive elements into the bearing and/or pulley.

By way of an illustration: in coal mining applications, dust particles of sizes between 1 um and 100 um may remain suspended in the air for some time after initial air disturbance has ceased to act. Such micro particles suspended in the air may enter unprotected bearings during air exchange with the outside thereby significantly reducing bearing work-life breaking the pulley and/or stopping conveyor operation.

Protector component 110 of FIGS. 1A-1B (e.g. made from felt and/or other materials described herein) may provide for a greater protection of the bearing assembly from dust, micro particles, and/or other particulates and/or aggressive environment by providing a robust filtering barrier and by substantially reduce transfer of particular matter into the bearing while allowing for air flow passage across the protector element. The protector component may prevent passage of micro particles (e.g., with sizes in the range from 1 micrometer to 100 micrometer) through the bearing.

Bearing protectors 100, 140 may be utilized with typical pulley/bearing assemblies thereby enabling of retrofitting of existing installations in order to increase reliability. Use of the bearing protector of the present disclosure may provide for one or more of increase in technological effectiveness of installation in majority of rotary groups, where other types of protection were used earlier, increase operational lifetime of the bearing; reduction in installation and/or maintenance costs; reduction of equipment downtime. Bearing protector assemblies described herein are easy to manufacture and use.

Figure 2A:
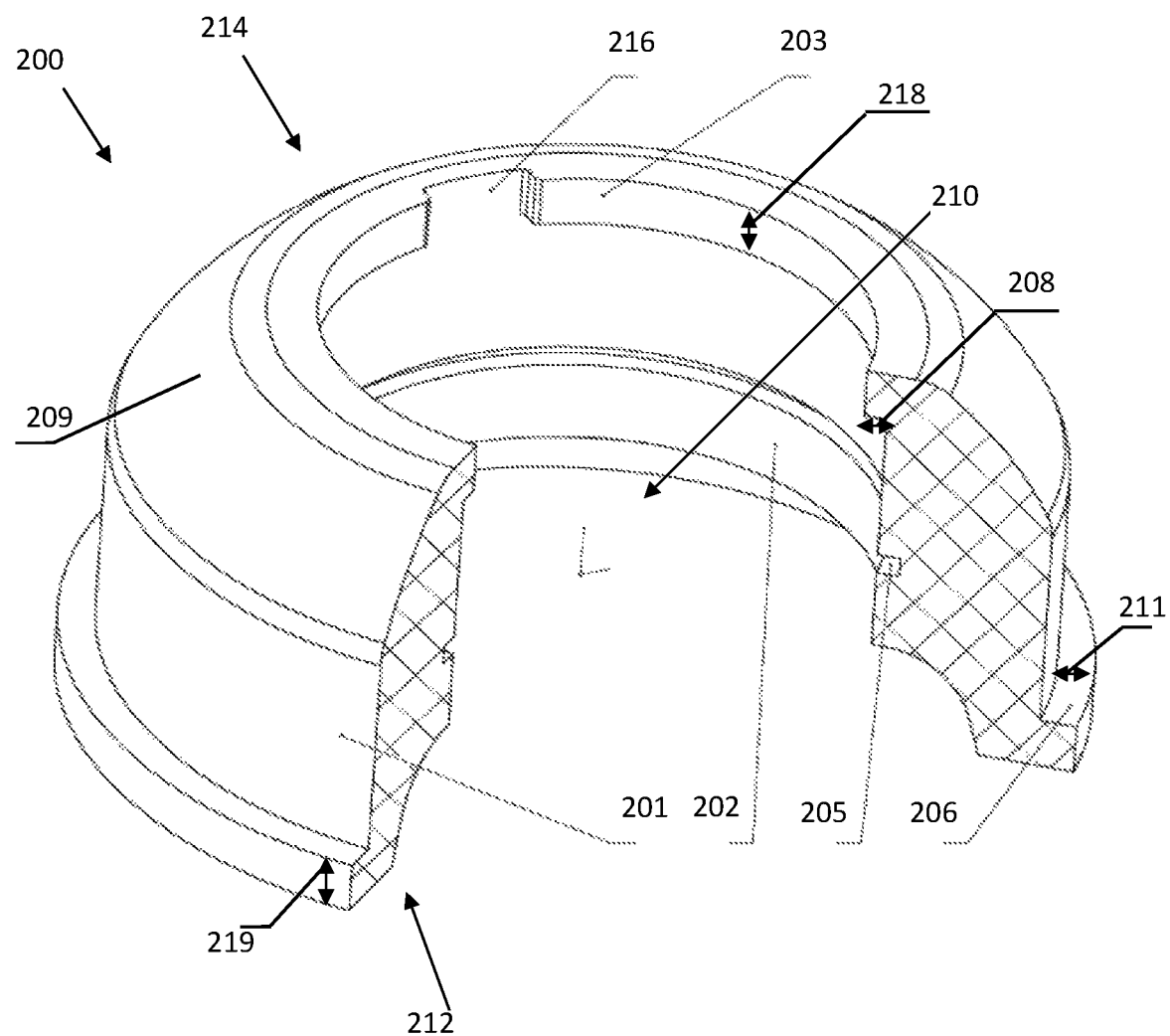
FIGS. 2A-2E illustrate some implementation of a bearing housing for use in a pulley apparatus.
Figure 2B:
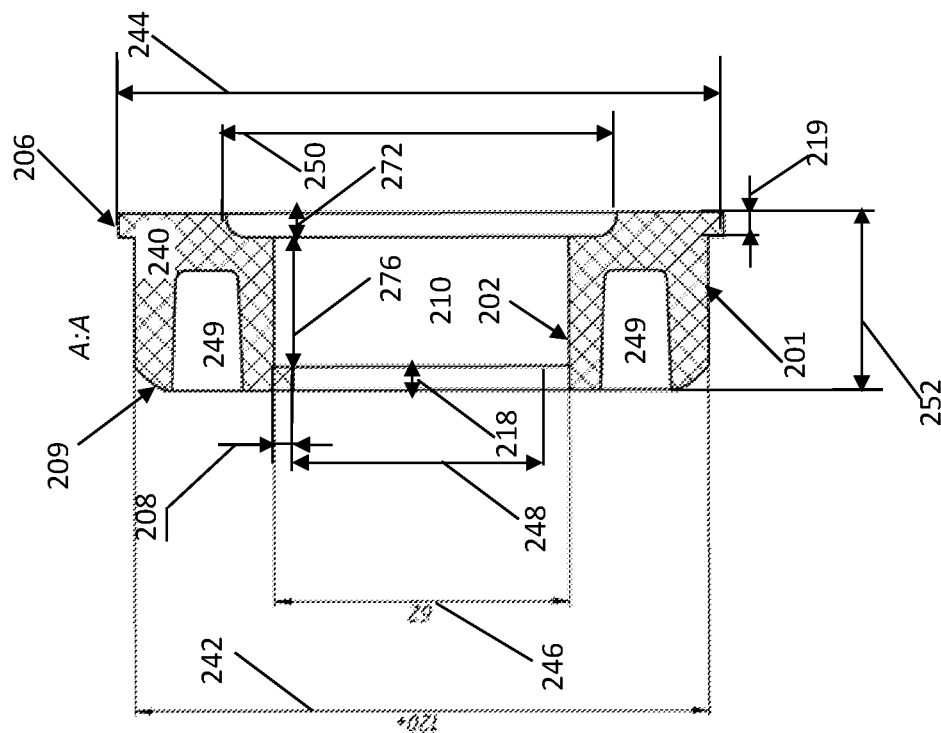
Figure 2B:
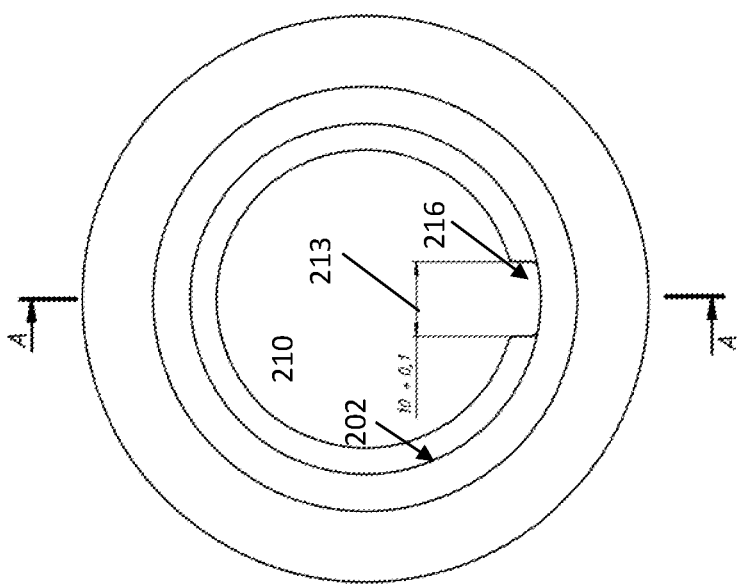
Figure 2C:
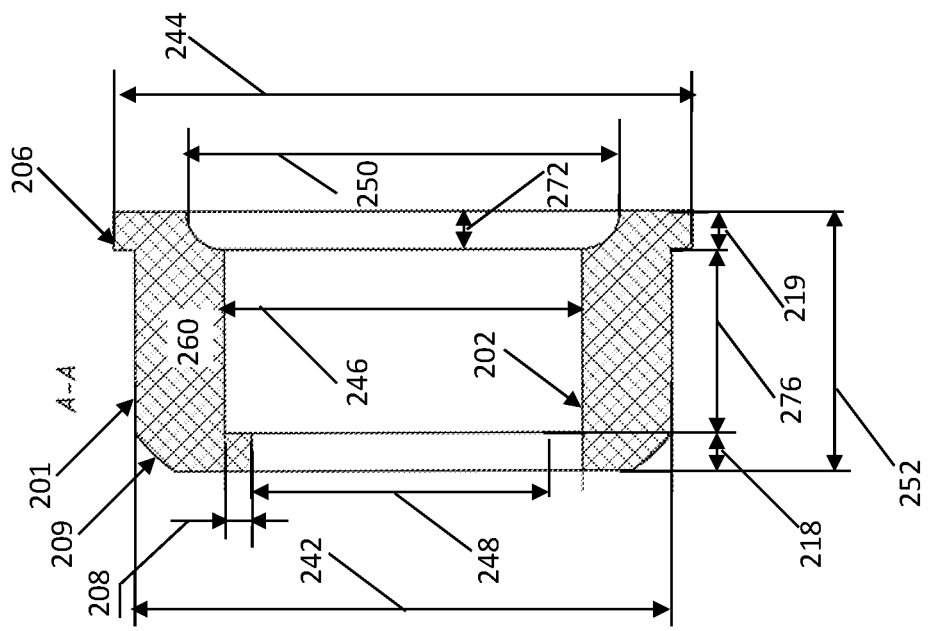
Figure 2C:
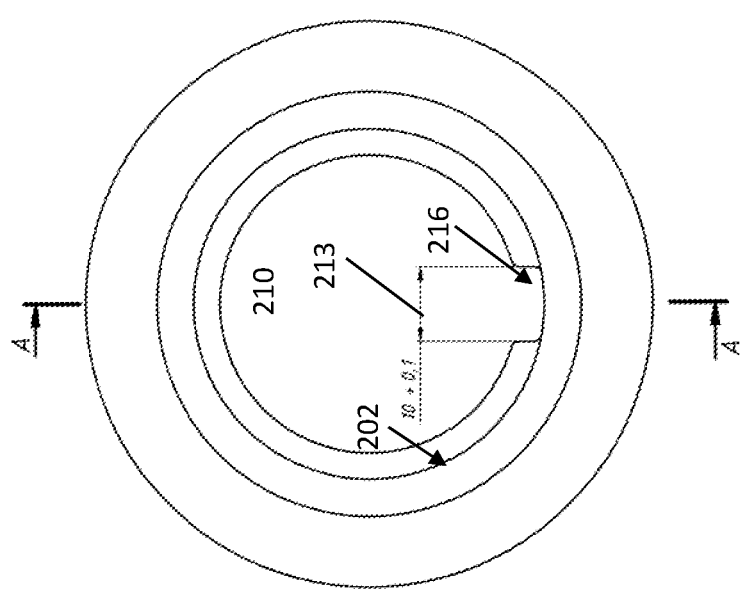

FIGS. 2A-2C illustrate some implementations of a bearing housing for use with pulley assemblies.

FIG. 2A is a perspective view illustrating one implementation of a bearing housing. The bearing housing 200 of FIG. 2A may also be referred to as the pulley endcap and/or or endcap. Bearing housing of the present disclosure, e.g., including these described with respect to FIGS. 2A-2C) may be used in pulley assemblies of various diameters, with standard metal bearings (e.g., as described with respect to FIGS. 5A-5D) and with self-lubricating bearings of the present disclosure (e.g., as described with respect to FIGS. 6A-6D).

The outer diameter of the bearing housing 200 may be selected in a manner to ensure installation in a tubular housing of a pulley (e.g., housing 520 of the pulley assembly 500 of FIG. 5A and/or 600 of FIG. 6A) with proper tension by means of pressing-in so that the bearing housing remains inside the pulley tube without change of its position during continuous operation. By way of an illustration, for a pulley tube diameter of 76 mm and the tube wall thickness of 3 mm, the outside diameter of the bearing housing 200 main body (formed by the outer surface 201) by the may be selected at 70.4 mm. In some implementations, the tube wall thickness may be selected from the range between 2 mm and 8 mm, depending on requirements for a given pulley design.

The pulley endcap 200 includes a flange (shoulder) 206 extending outwards from the external surface 201 of the housing 200. The flange 206 is used to limit insertion of the housing 200 into the pulley during assembly.

The bearing housing 200 may include an inner cavity 210 formed by an interior wall 202. The inner cavity 210 may receive a self-lubricating bearing component, e.g., such as bearing assembly 400 of FIG. 4A and/or metal bearing (e.g., 502 in FIG. 5A). Diameter of the inner cavity 210 may be selected to match bearing external dimensions, as described below with respect to, e.g., FIGS. 3A-3D. A circular channel (also referred to as the groove) 205 may be formed around the perimeter of the inner wall 202. The groove 205 may be used to receive a retaining ring to hold self-lubricating bearing component during bearing assembly.

Figure 6A:
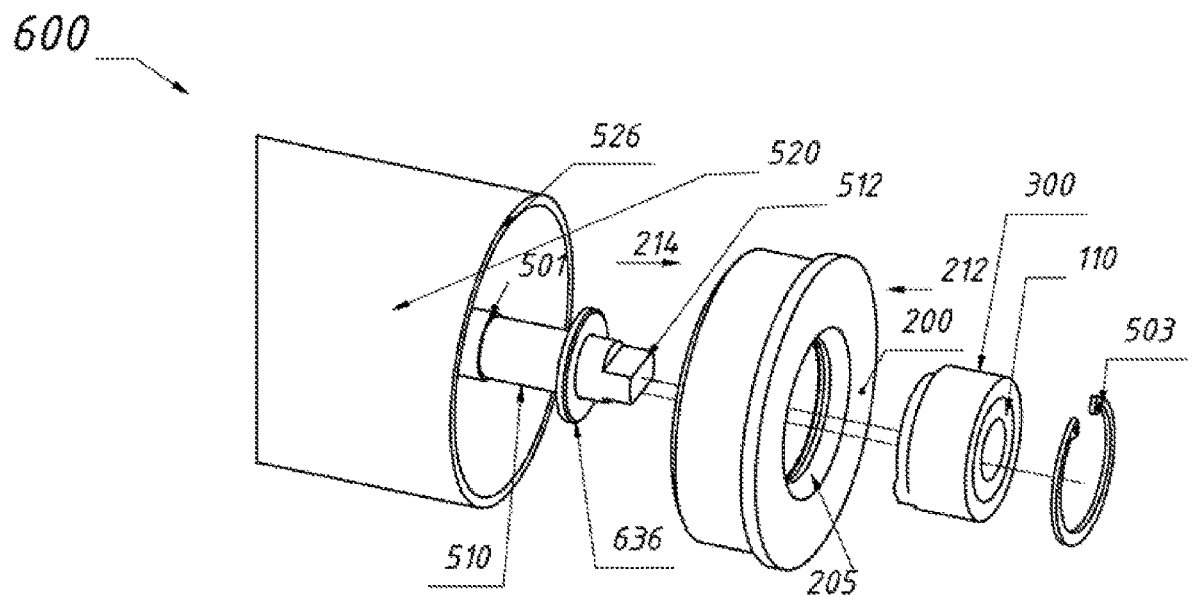
FIGS. 6A-6D illustrate a pulley assembly with a self-lubricating bearing in accordance with some implementations of the disclosure.

The bearing housing 200 may be characterized by an outer face 212 (e.g., the side exposed to the outside of the pulley) and an inner or inside face 214 (e.g., the side facing the inside of the pulley assembly), e.g., as shown and described with respect to FIG. 6A.

The inner cavity 210 may include an aperture formed proximate the inner face by a shoulder 203. As shown in FIG. 2A, the shoulder 203 extend inwards towards the axis of the bearing housing 200 thereby providing a stopping barrier configured to arrest insertion of a bearing assembly into the inner cavity 210 of the bearing housing. A cavity may be formed in the shoulder. In some implementations, the cavity may include a rectangular slot 216. The slot 216 may receive a key (notch 312) as described with respect to FIGS. 3A-4D. Dimensions of the shoulder 203 may be configured as follows: radial dimension 208 may be selected from the range between 2 mm and 8 mm, preferably 5 mm for a housing 200 configured to receive radial bearing (e.g., 204PP, 304PP, 305PP, 306PP, and/or other metal radial bearing); axial dimension 218 may be selected from the range between 2 mm and 8 mm, preferably 5 mm for a housing 200 configured to receive a radial bearing (e.g., 204PP, 304PP, 305PP, 306PP, and/or other metal radial bearing). An exemplary design of the bearing housing 240 configured to support radial metal bearing 305PP is shown in FIG. 2B; an exemplary design of the housing 260 configured to support radial metal bearing 204PP is shown in FIG. 2C. Dimensions in FIGS. 2B-2C are given in mm.

Combination of the slot 216 and the key 312 may form a keyed joint configured to prevent axial movement of a bearing component within the bearing housing.

The bearing housing 200 of FIG. 2A may be manufactured by means of pressure die casting.

Engineering polymers (e.g., fiberglass) may be used for manufacturing of bearing housing 200. In some implementations, co-polymers may be used. By way of a non-limiting illustration, such materials may include polyamide polymers (e.g., Nylon, Capron resins) PA6, PA6.6, PA11, PA12, PA610 and/or other; ABS, polycarbonate, PC/ABS, Polyoxymethylene (POM), that may be characterized by high durability, thermal resistance, deformation resistance.

Based properties of a given material may be modified using additives to improve their processing and end-use performance. These additives may be classified as follows: reinforcing fibers, fillers, and coupling agents; plasticizers; colorants; stabilizers (halogen stabilizers, antioxidants, ultraviolet absorbers, and biological preservatives); processing aids (lubricants, others, and flow controls); flame retardants, peroxides; and antistats, hydrophobic additives, and/or other additives.

Fiber filled plastics (e.g., fiberglass), may be fabricated using base plastic impregnated with short strands of glass fiber thereby providing a material of high strength and durability that is much lighter than steel. Fiber filled plastics may contain between 5 and 50% of glass fiber by volume, preferably 30% in some implementations.

These materials may be selected to have sufficient mechanical strength, shock and vibration resistance. In accordance with a given application, selected material may be resistant to hydrocarbons (kerosene, benzene, etc.), mineral oils, concentrated and weak alkali, weak acids. Bearing housing materials may include heat stabilizers. They are used for manufacture of various structural items and parts that are used in engineering and that operate in conditions of shock loads and vibrations. The parts manufactured in such a manner do not require further mechanical adjustment and have a number of advantages:

- they are significantly lighter in weight and it allows to decrease considerably inertial mass of rotating parts of a conveyer on start;
- installation in the tube is performed without mechanical bore of the tube by means of pressing-in with proper tension so that the body remains inside the tube without change of its position during continuous operation;
- during pressing-in of the bodies in the tube there is alignment of the latter and it allows for rather good alignment of the whole construction;
- no types of installation of integral parts are used when assembling;
- target integrity of a pulley assembly is achieved; and
- high resistance to corrosion.

Returning now to FIG. 2A. The bearing housing may be press fitted into pulley housing. In some implementations, pulley housings may be fabricated from a metal (e.g., steel) tube. Bearing housing may include a slanted wall portion 209 in order to facilitate initial insertion and/or centering of the bearing housing within the pulley.

Figure 5A:
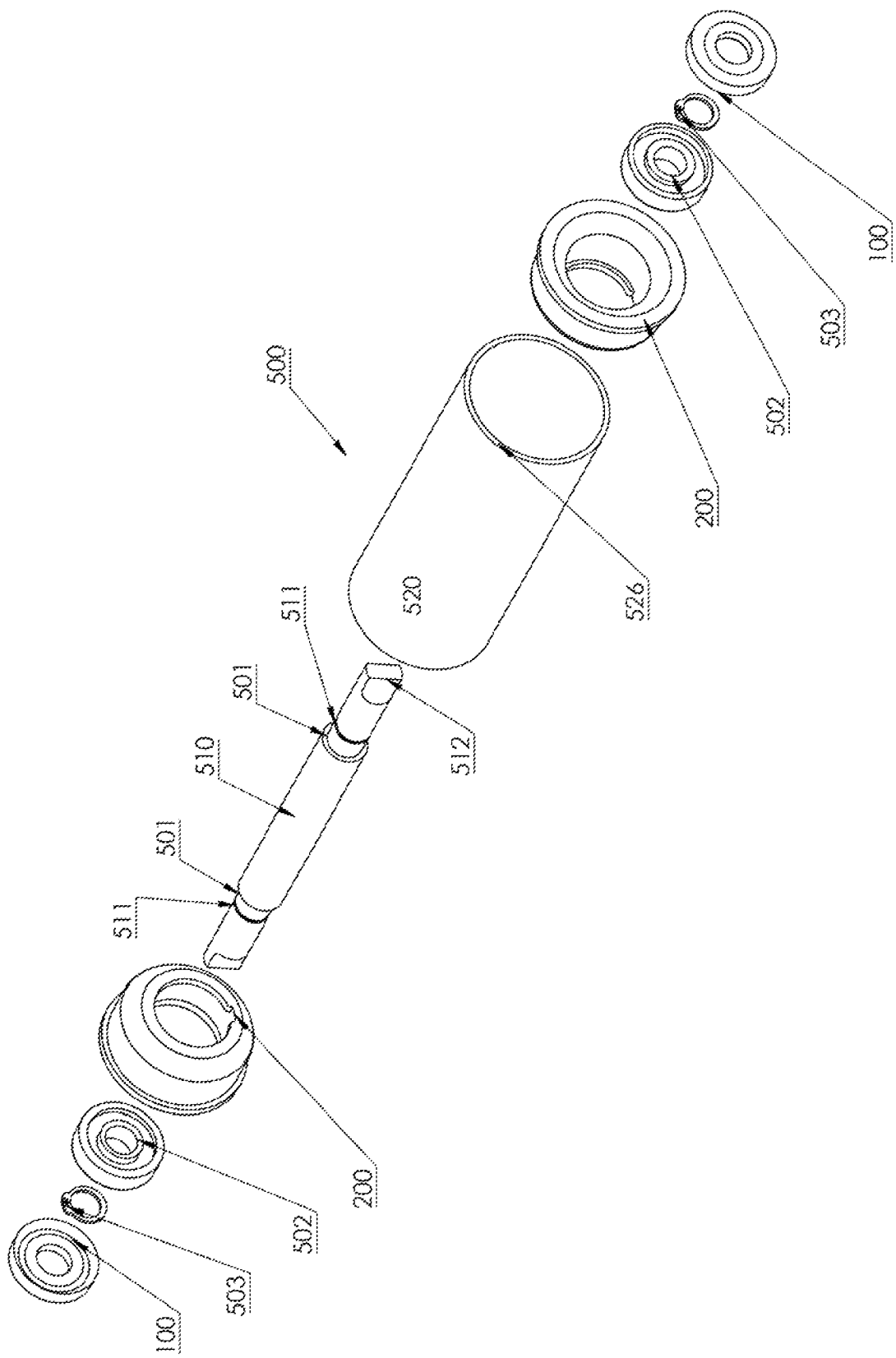
FIG. 5A is an exploded perspective view illustrating a pulley assembly with a metal internal roller bearing and a bearing protector in accordance with some implementations of the disclosure.
Figure 5B:
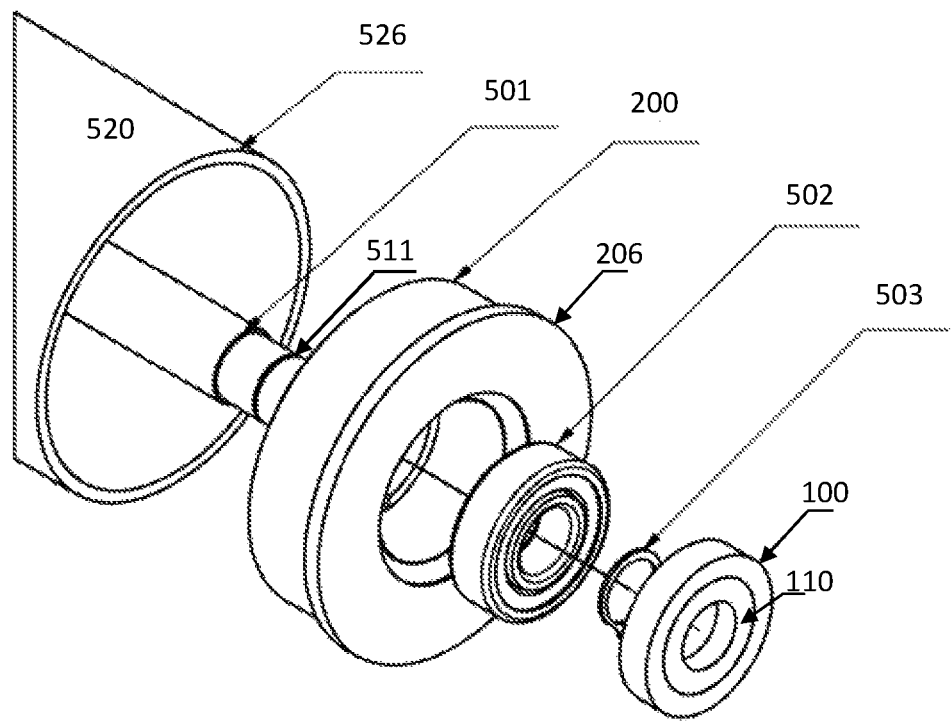
FIG. 5B is an exploded perspective view illustrating a portion of the pulley assembly of FIG. 5A.

The bearing housing 200 may be press-fit into the pulley housing (520 in FIG. 5) until the flange 206 sits against the tube edge 526 in FIG. 5B). Tube used for pulley housing may be characterized by a non-uniform wall thickness and/or non-uniform curvature. In some applications, the bearing housing outside diameter may be made slightly larger (e.g., by 0.4 mm in one implementation) than the pulley housing inner diameter. During bearing housing installation, a portion of the housing may be "shaved off" by the edge 526 of the tube thereby "molding" the bearing housing to the specific internal profile of the pulley housing. The shaved off excess plastic may be removed. The resultant assembly may offer a sufficiently strong formed joint without use of mechanical fasteners and/or other attachment parts.

Figure 2D:
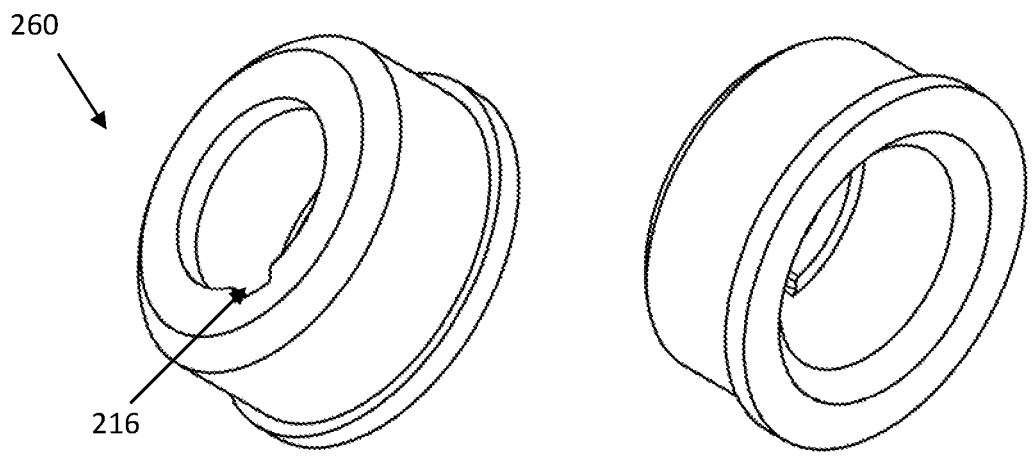
Figure 2E:
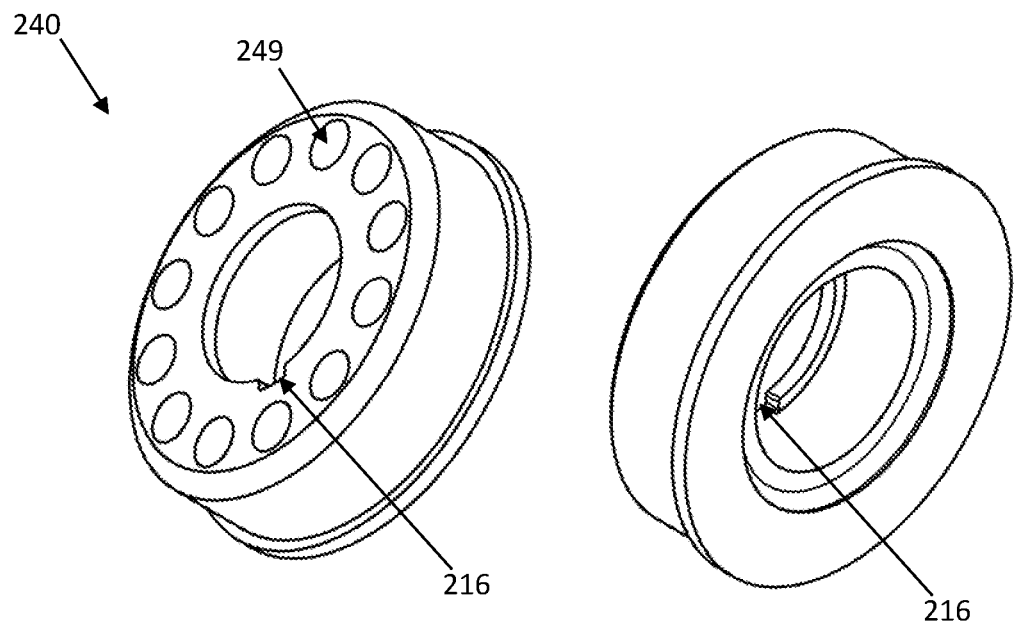

FIGS. 2C and 2D illustrate a one implementation of the bearing housing. The housing 260 may be configured to receive a bearing FIGS. 2B and 2E illustrate a reduced-weight implementation of the bearing housing. To reduce material use and the weight of the part, the housing 240 in FIGS. 2B 2E is configured to include cavities 249 arranged as shown in FIG. 2E. Cavities 249 may be formed during casting of the housing 240 and/or machined after the casting of the part. Use of the cavities 249 may enable weight reduction of the housing 240 between 10% and 20% compared to a solid body design (in the absence of cavities 249).

Figure 3A:
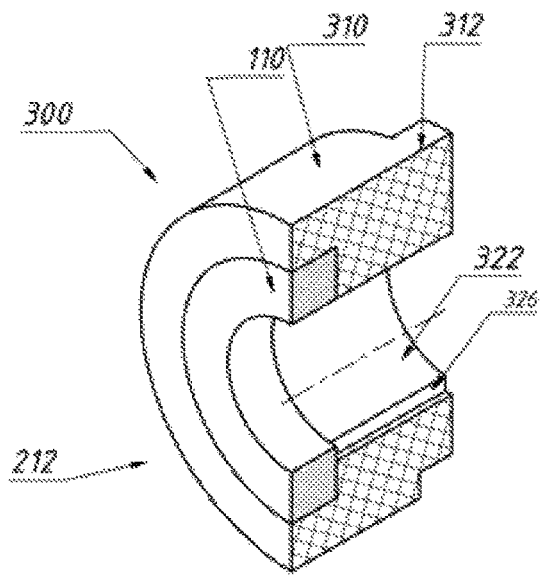
FIGS. 3A-3B illustrate a self-lubricating bearing for use in conveyor pulleys in accordance with some implementations.
Figure 3B:
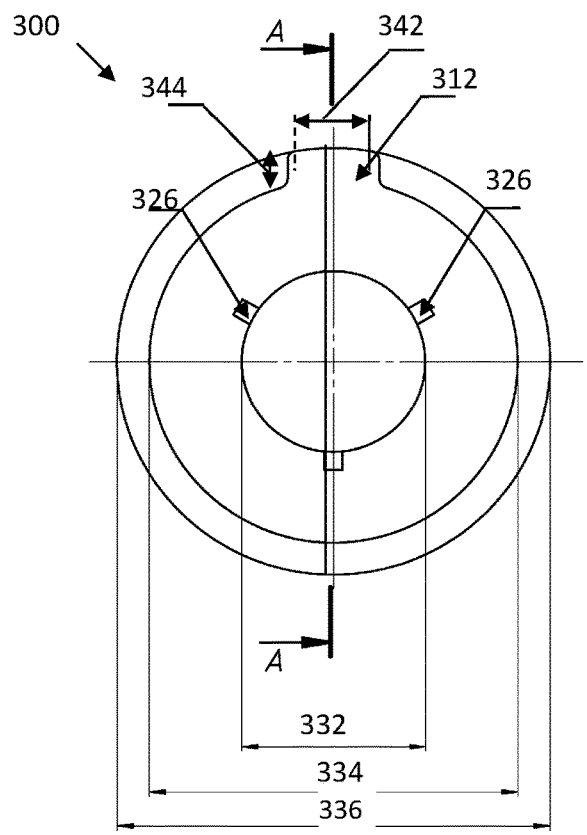
Figure 3B:
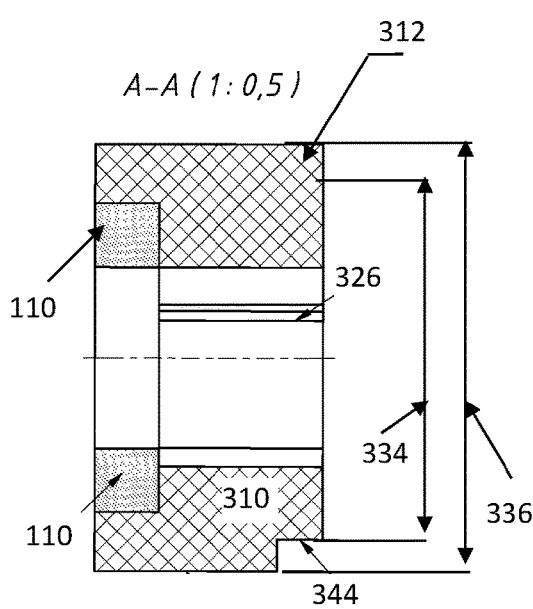

FIGS. 3A-3B illustrate a self-lubricating bearing (SLB) for use with conveyor pulleys in accordance with some implementations of the disclosure. The self-lubricating bearing 300 shown in FIGS. 3A-3B may also be referred to as a sleeve bearing, sliding bearing, bushing, and/or self-lubricating bushing.

Figure 6B:
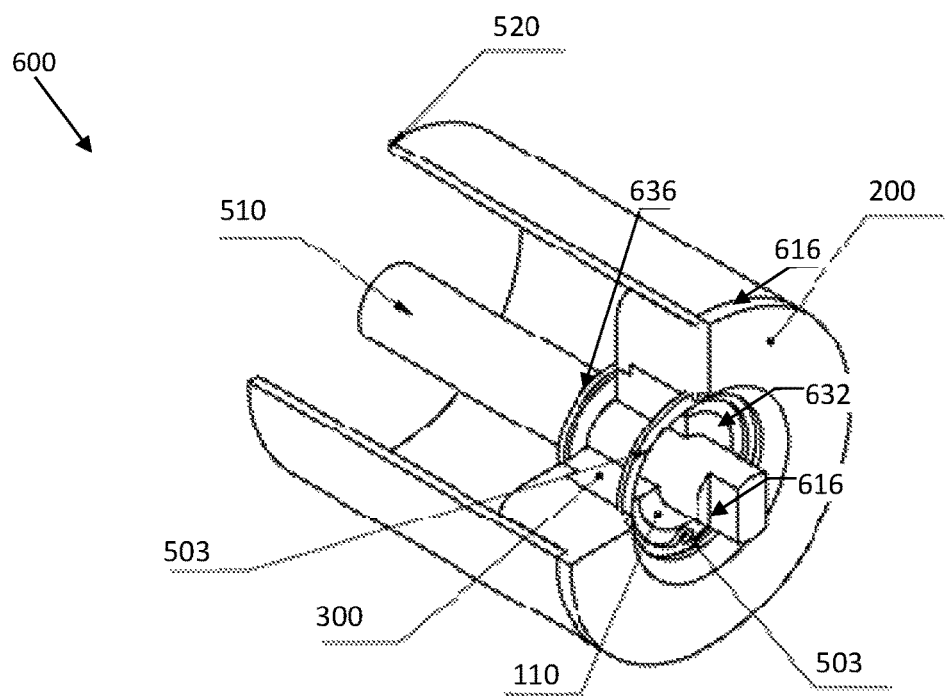

Bearings designed in accordance with the principles of the present disclosure may be utilized a variety of machinery applications, including rotary groups of belt conveyer pulleys, e.g., as shown and described in FIGS. 6A-6B. In some applications, SLB may be used to replace previously used radial metal bearings (e.g., 204PP, 304PP, 305PP, 306PP, and/or other metal radial bearing) during pulley repair and/or retrofit.

Self-lubricating bearing 300 of FIG. 3A is a monolithic design manufactured by means of pressure die casting from special engineering types of plastic (POM, polyamide plastics, etc.) with addition of antifriction agents, in order to reduce coefficient of friction.

FIG. 3A is a perspective view of the SLB. Bearing 300 may include a bearing body 320 and a protector component 110. The component 110 may be integrated into the SLB by means of pressure die casting during fabrication of the bearing 300.

Inner wall 322 in FIG. 3A forms an annulus be configured to fit an axle (e.g., axle 510 in FIG. 5A); cylindrical outer surface 310 may be configured to match dimensions of one or more standard radial bearings (e.g., 204PP, 304PP, 305PP, 306PP, and/or other metal radial bearing).

FIG. 3B illustrates a plan view of the bearing 300 as seen from the inner face 214 of the bearing (e.g., the side facing the inside of the pulley assembly) and a cross-section view.

Inside diameter 332 of the bearing may be configured to match diameter of the axle. By way of an illustration, for a 20 mm axle diameter, bearing inner diameter 332 may be selected between 20.1 mm and 20.2 mm to ensure sufficient clearance during installation of the bearing onto the axle.

Outside diameter 336 of the bearing may be configured to match diameter of standard bearing sizes thereby allowing installation and use in standard pulley designs. By way of an illustration, for a pulley designed to include 204PP radial bearing, diameter 336 may be selected at 47 mm; for a pulley designed to include 304PP bearing, diameter 336 may be selected at 52 mm.

Bearing body 300 may include a portion 344 with smaller outside diameter 334. Diameter 334 may be smaller than diameter 336 by 2 mm to 6 mm, preferably 5 mm. The narrower portion 344 may fit within the shoulder 203 of the bearing housing shown in FIG. 2A.

The bearing 300 may include a tab 312 configured to fit into the slot 216 within the housing 200 shown and described with respect to FIG. 2A. Dimensions of the tab 312 may be selected between 3 mm and 12 mm in width and 3 mm and 8 mm in depth for a bearing with 47 mm outside diameter. The tab 312/slot 216 combination may produce a keyed joint providing for a tight coupling between the bearing body 320 and the bearing housing 200 and preventing radial displacement of one relative another.

The bearing 300 may further include one or more linear grooves 326 fabricated within the inner wall 322 of the bearing body. Groove width may be selected between 1 mm and 3 mm, preferably 2 mm; groove depth may be selected between 1 mm and 3 mm, preferably 2 mm for a bearing designed to fit 20 mm diameter axle. Various groove profiles may be used, rectangular, triangular, half cylinder, trapezoidal. Larger or smaller groove dimensions may be used with larger/smaller bearings accommodating larger/smaller axles and/or loads. Longer axles (e.g., 700 mm and more), and/or pulley designs where coaxial component installation may not be economical and/or practical, wider and/or deeper grooves and/or larger number grooves may be used. One or more grooves 326 may be packed with consistent lubricant (thick grease such as Veedol, solidol) to reduce friction.

During operation, the bearing may heat up. Due to nature of the plastics used in fabrication of the bearing body 320, the plastic material may not be ground down to produce a fit but may heat up and deform (melt). The grooves 326 may accommodate the excess of plastic material produced by this deformation and thus prevent bearing seizing and/or destruction.

A variety of materials may be used for fabricating the bearing 300 including but not limited to polyamide polymers (e.g., Nylon, Capron resins) PA6, PA6.6, PA11, PA12, PA610 and/or other; Polyoxymethylene (POM), that may be characterized by high durability, thermal resistance, deformation resistance. In one or more applications, thermoplastic polyethylene materials, such as ultra-high-molecular-weight polyethylene (commonly referred to as the UHMWPE, UHMW-PE); also known as high-modulus polyethylene, (HMPE), may be used for fabricating the bearing 300.

In some applications, where high resistance to acids and/or other corrosive agents may be desired, bearings 300 may be manufactured using polycarbonate (PC) or acrylonitrile-butadiene-styrene (ABS), thermoplastic polyethylene materials, or a combination thereof.

In order to reduce friction between the bearing inner surface (322) and the pulley axle, plastic materials used for manufacturing bearing body may be permeated with antifriction agent. Such antifriction agent may include one or more of talcum, graphite, molybdenum disulfide, stearates, and/or other additives.

In one or more implementations, plastics filled with a lubricant additive, e.g., oiled filled ultra-high molecular weight polyethylene (e.g., Tivar®, Polyslick®), and/or oil filled nylon (e.g., Nyloil™), may be used to produce self-lubricating bearing of the present disclosure.

Figure 4A:
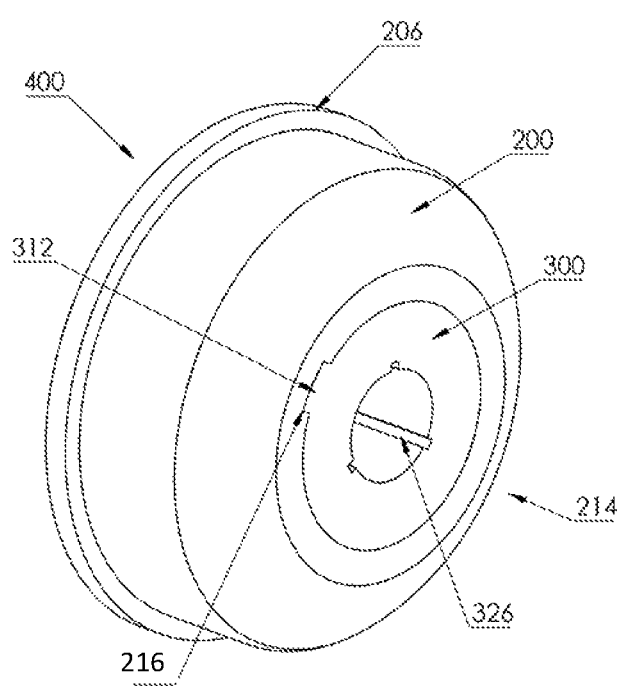
FIGS. 4A-4B illustrate a bearing assembly including the self-lubricating bearing of FIG. 3A installed in the bearing housing of FIG. 2A in accordance with one or more implementations.

In conveyor pulley applications, SLB components may be installed in the pulley endcap/bearing housing, e.g., 200 of FIG. 2A. FIG. 4A is a perspective view of the SLB installed in the pulley endcap. Endcap assembly 400 of FIG. 4A includes the self-lubricating bearing 300 press fitted into the bearing housing (pulley endcap) 200. View of FIG. 4A shows the endcap assembly as viewed from the inner side of the bearing housing 214. View of FIG. 4A illustrates the tab 312 disposed within the slot 216, and three grooves 326.

Figure 4B:
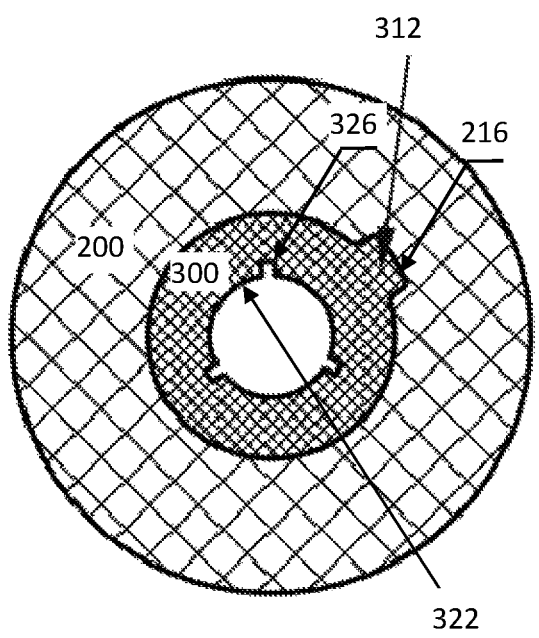

FIG. 4B is a plan view of the endcap assembly 400 as seen from the inner side 214 of the bearing (e.g., the side facing the inside of the pulley assembly). The tab 312/slot 216 combination produce a keyed joint providing for a tight coupling between the SLB 300 of FIG. 4B and the housing 200 and preventing radial displacement of one relative another. In order to facilitate installation of the SLB into the bearing housing and obtain fit, a proper sliding clearance is considered. In some applications where in the SLB and the bearing housings are fabricated from plastic materials, e.g., including these described herein, the inside diameter the inner cavity of the bearing housing (246 in FIG. 2C) may be selected at 47 mm.

Plain bearings also may be made of engineered plastics, which provide excellent wear resistance and low friction in both dry and lubricated operating conditions. Being injection molded, they can be designed to almost any shape and produced from a variety of resins compounded solid lubricant. These bearings exhibit excellent dimensional stability, low coefficients of friction and good thermal conductivity.

Composite self-lubricating bearings of the present disclosure offer one or more advantages such as low-friction, wear-resistance, support high static and dynamic loads, while their inert nature makes them suitable for corrosive environments. Use of lubricant impregnated felt bearing protector of the present disclosure enables protection of the bearing from dust and/or environment during operation and may extend bearing working life.

FIGS. 5A-5E illustrate use of the plastic bearing housing and bearing protector of the present disclosure in pulley assemblies that utilize metal bearings. FIG. 5A is an exploded perspective view illustrating a pulley assembly. The pulley assembly 500 may include cylindrical pulley housing 520, an axle 510 (that also may be referred to as the shaft), a pair of plastic pulley endcaps 200, two metal bearings 502, two retaining rings 503, and two bearing protectors 100. In some implementations, the retaining ring may comprise a spring-loaded split ring. The axle may feature a shoulder 501 (on each side) configured to limit the extent of insertion of the bearing 502. The axle may feature a circular groove 511 (one on each side) configured to receive the retaining ring 503. Each end of the axle 510 may include a shaft key 512 to facilitate installation, assembly, and/or maintenance of the pulley. In some implementations, the shaft key 512 may include one or more flat facets forming, e.g., a triangular key, rectangular key, hex key and/or other key; one or more slots, threaded end, and/or other features configured to facilitate coupling of a keyed tool to the shaft.

Pulleys of a variety of sizes may be used with the SLB and/or plastic endcap of present disclosure including but not limited to pulley diameter of 76 mm (3 in), 102 mm (4 in), 127 mm (5 in), 152 mm (6 in). In some applications the SLB and/or plastic endcap of present disclosure may be used with pulleys with diameter of 89 mm (3.5 in), 108 mm (4.25 in), and/or 133 mm (5.24 in).

Figure 5C:
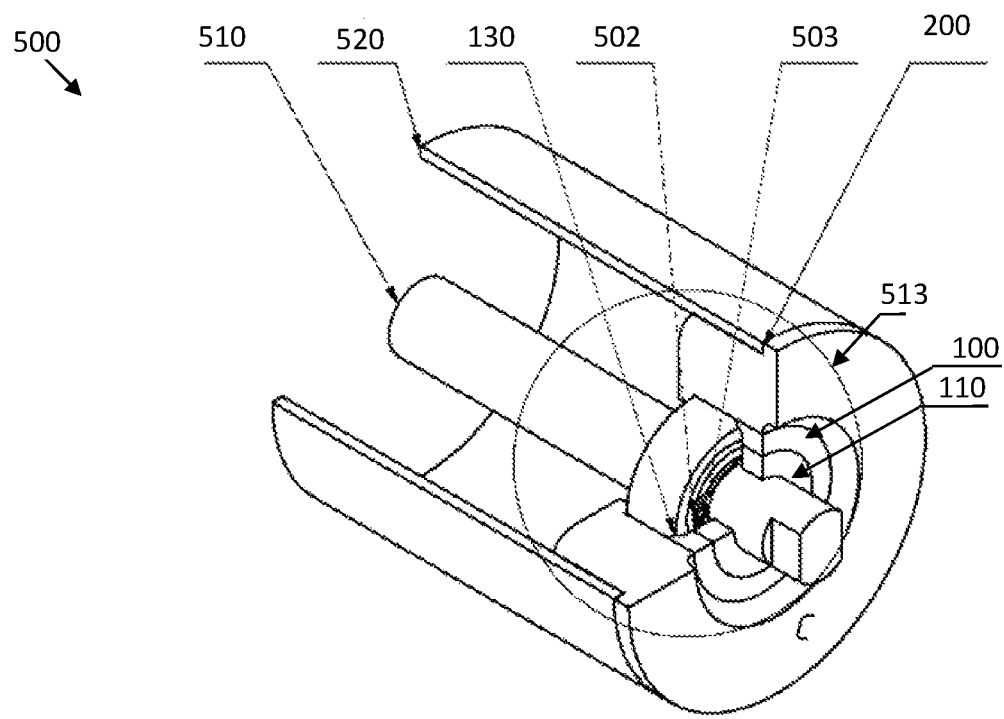
FIG. 5C is a perspective view illustrating a portion the pulley assembly of FIG. 5B.

FIG. 5B illustrates a portion exploded view of the pulley assembly 500 of FIG. 5A. FIG. 5C illustrates a perspective view of the assembled pulley portion shown in FIG. 5B. During assembly, the endcap 200 may be press-fitted into the pulley housing 520 until the flange 206 sits against the pulley housing edge 526 in FIG. 5B. Tubes used for pulley housing may be characterized by a non-uniform wall thickness and/or non-uniform curvature. In some applications, the pulley endcap outside diameter (e.g., 242 in FIG. 2B or FIG. 2C) may be made slightly larger (e.g., by 0.4 mm in one implementation) than the pulley housing inner diameter. During bearing housing installation, a portion of the pulley endcap may be "shaved off" by the edge 526 of the tube thereby "molding" the endcap to the specific internal profile of the pulley housing. The shaved off excess plastic may be easily removed. Pulley endcap 200 may include a slanted wall portion 209 in order to facilitate initial insertion and/or centering of the bearing housing within the pulley during assembly. The resultant assembly may offer a sufficiently strong formed joint without use of mechanical fasteners and/or other attachment parts.

Figure 5D:
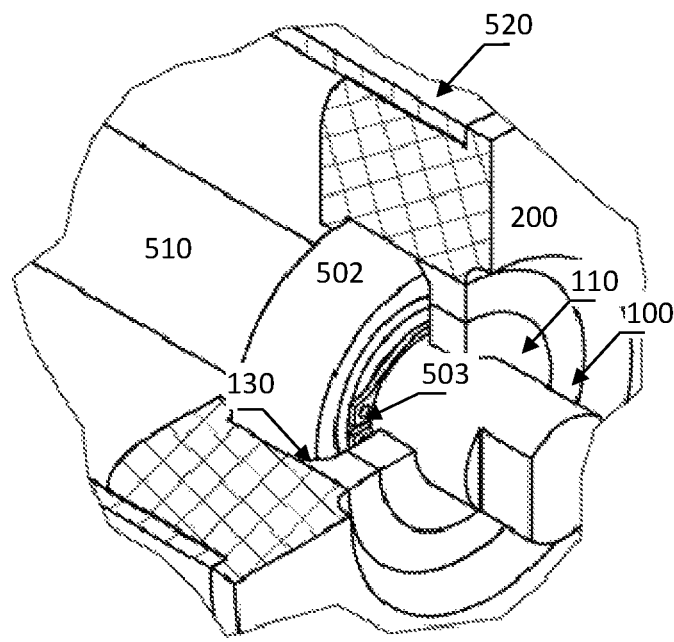
FIG. 5D illustrates an enlarged portion of the pulley assembly of FIG. 5B detailing seal protection configuration.

FIG. 5D illustrates an enlarged portion of the pulley assembly of FIG. 5C (within the circle denoted 513) detailing bearing protection configuration. Use of the slanted chamfer 130 enables sufficient separation of the bearing protector 100 from the bearing 502 such to prevent rubbing of the protector element 100 against the retaining ring 503. After installation into the pulley housing, a portion of the endcap 200 (endcap flange 206) is visible.

Figure 5E:
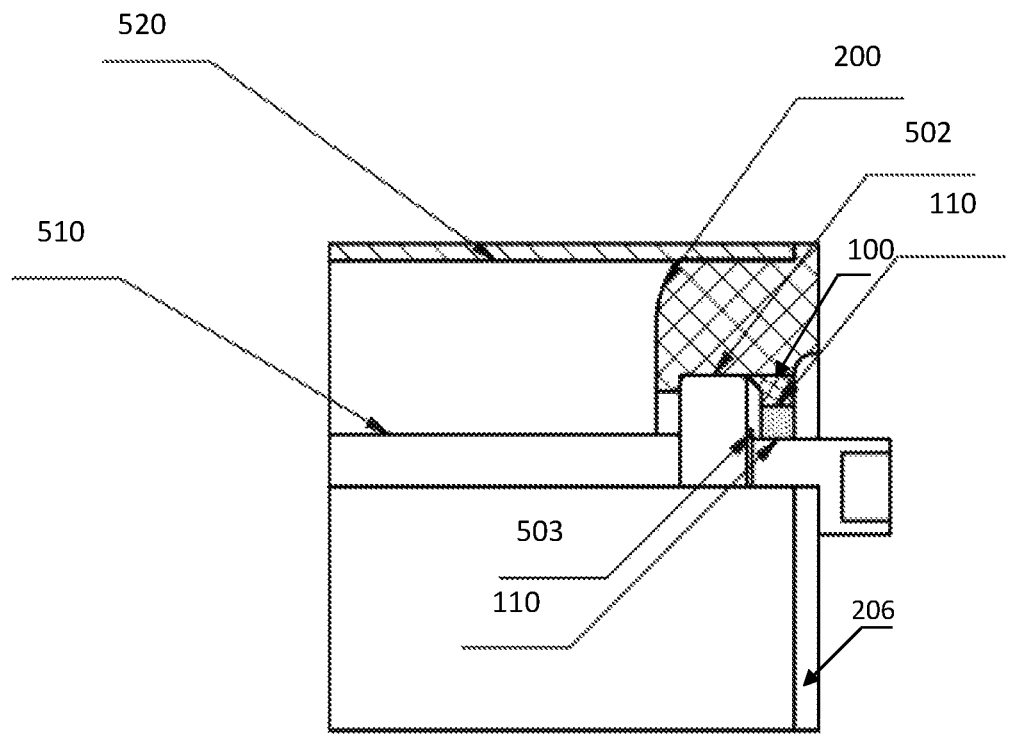
FIG. 5E is a section view of an end portion of the pulley assembly of FIGS. 5A-5C.

FIG. 5E is a section view of an end portion of the pulley assembly of FIGS. 5B-5D illustrating mutual configuration of the pulley housing 520, the axle 510, the pulley endcap 200, the metal rotary bearing 502, the bearing protector 110, and the retaining ring 503.

Returning now to FIG. 5A, the pulley assembly 500 may be obtained as follows:

two pulley endcaps 200 may be press-fitted into the pulley housing 520 until the flange 206 sits against the pulley housing edge 526. Tubes used for the pulley housing may be characterized by a non-uniform wall thickness and/or non-uniform curvature. Outside diameter (e.g., 242 in FIGS. 2B-2C) of the pulley endcap 200 may be made slightly larger (e.g., by 0.2 mm to 0.4 mm in some implementations) than the inner diameter of the pulley housing 520. During installation, a portion of the pulley endcap outer surface 201 may be "shaved off" by the edge 526 of the tube thereby "molding" the endcap to the specific internal profile of the pulley housing. The shaved off excess plastic may be easily removed. Pulley endcap 200 may include a slanted wall portion 209 in order to facilitate initial insertion and/or centering of the bearing housing within the pulley during assembly;

radial bearings 502 installed on the axle and pressed into the pulley endcap housing cavity without significant efforts (e.g., by hand) until the bearing comes into contact with the shoulder 203; and retaining rings 503 disposed to fit into the radial groove 205;

bearing protector 100 installed proximate the radial bearing 502; the protector component 110 of the bearing protector may be impregnated (soaked) with a lubricating fluid (e.g., a machine oil or other).

The resultant assembly (e.g., 500 in FIG. 5C) may offer a sufficiently strong formed joint without necessitating of machining pulley housing inside surface, use of mechanical fasteners and/or other attachment parts.

In order to facilitate installation of the bearing (e.g., 502) into the bearing housing 200 and obtain fit, a proper clearance is considered. In some applications where in the SLB and the bearing housings are fabricated from plastic materials, e.g., including these described herein, the inside diameter (e.g., 246 in FIG. 2C) of the inner cavity 210 of the bearing housing may be selected at 47 mm.

FIGS. 6A-6D illustrate pulley assembly with a self-lubricating bushing in accordance with some implementations of the disclosure. FIG. 6A is an exploded perspective view of the pulley assembly 600. The pulley assembly 600 may include tubular pulley housing 520, axle 510, a pair of plastic pulley endcaps 200, a pair of metal disks (washers) 636 disposed on the inner side of the endcaps 200 and configured to rest against the axle shoulder 501; a pair of self-lubricating plastic bearings 300 with integral bearing protectors, and two retaining rings 503. It is noteworthy that only one of the pulley endcap 200, SLB 300 and the retaining ring 503 is shown in FIG. 6A for clarity. The disk 636 may be spot-welded to the axle at three or more locations 634. The retaining ring 503 is configured to fit into the radial groove 205 of the pulley endcap is shown in FIG. 6A.

Pulleys of a variety of sizes may be used with the SLB and/or plastic endcap of present disclosure including but not limited to pulley diameter of 76 mm (3 in), 102 mm (4 in), 127 mm (5 in), 152 mm (6 in). In some applications the SLB and/or plastic endcap of present disclosure may be used with pulleys with diameter of 89 mm (3.5 in), 108 mm (4.25 in), and/or 133 mm (5.24 in).

FIG. 6B illustrates a portion exploded view of the pulley assembly 600 of FIG. 6A. A metal disk (washer) 636 may be placed onto the axle 510 behind the endcap 200 as shown in FIG. 6B. The disk 636 may be spot-welded to the axle at three or more locations 634 (4-6 in some implementations), e.g. as shown on an enlarged view of the pulley assembly in FIG. 6C. The disk 636 may provide axial support to the SLB in order to, e.g., reduce potential deformation of the bearing body FIG. 6D is a section view of an end portion of the pulley assembly of FIGS. 6A-6C.

Figure 6C:
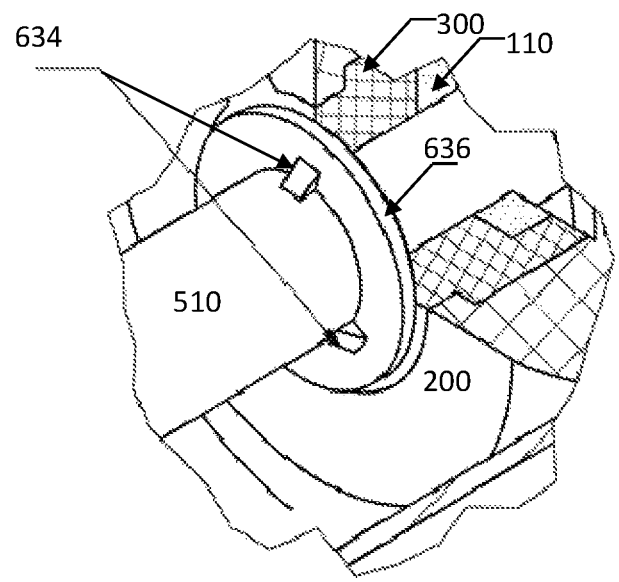
Figure 6D:
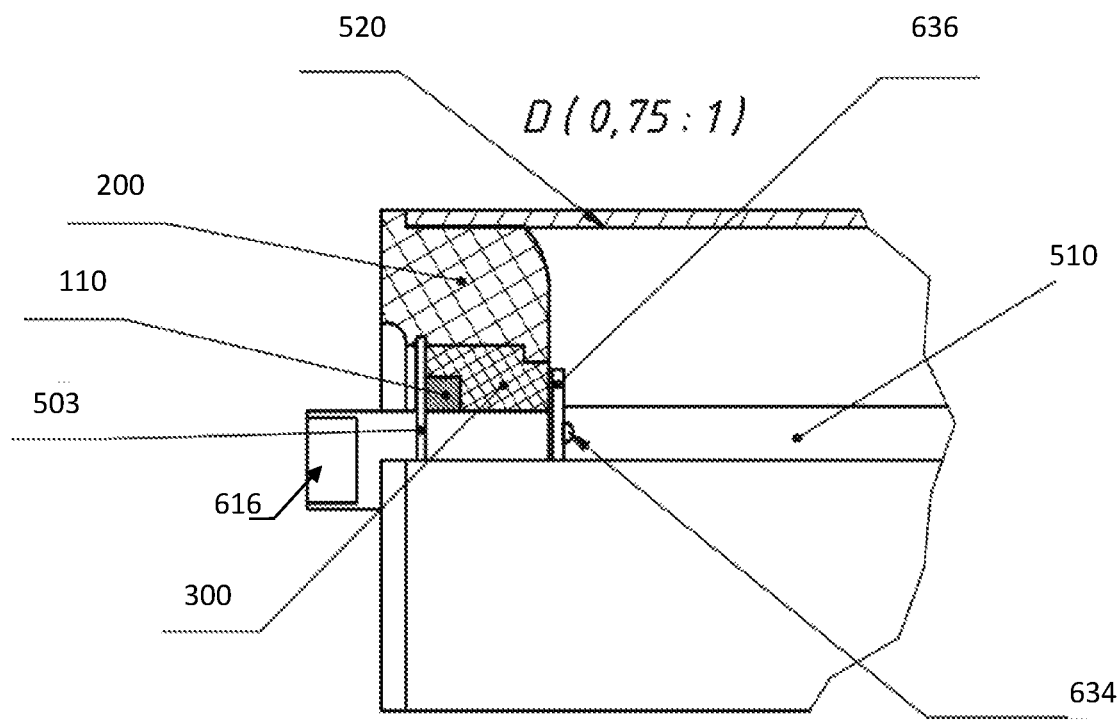

FIG. 6D is a section view of an end portion of the pulley assembly 600 of FIGS. 6A-6C. FIG. 6D illustrates relative configuration of the axle 510, disk 636, SLB 300, retaining ring 503.

Pulley assembly 600 may be obtained as follows:
pulley axle 510 may be pre-fitted with the disks 636 which may be mounted and spot-welded at three or more locations (e.g., 634 in FIG. 6C);
two pulley endcaps 200 may be press-fitted into the pulley housing 520 until the surface of the flange 206 sits against the pulley housing edge (526 in FIG. 6A). Tubes used for the pulley housing may be characterized by a non-uniform wall thickness and/or non-uniform curvature. Outside diameter (e.g., 242 In FIGS. 2B-2C) of the pulley endcap 200 may be made slightly larger (e.g., by 0.2 mm to 0.4 mm in some implementations) than the pulley housing inner diameter. During installation, a portion of the pulley endcap outer surface 201 may be "shaved off" by the edge 526 of the tube thereby "molding" the endcap to the specific internal profile of the pulley housing. The shaved off excess plastic may be easily removed. Pulley endcap 200 may include a slanted wall portion 209 in order to facilitate initial insertion and/or centering of the bearing housing within the pulley during assembly;
the protector component 110 of the bearing may be impregnated with lubrication fluid (e.g., machine oil or other);
in some implementations, the inner grooves 326 of the bearings (the SLB 300) may be packed with consistent lubricant (e.g., grease) in order to protect the axle 510 from corrosion and to extend operational duration of the pulley assembly;
the SLB 300 may be installed on the axle into the pulley endcap housing cavity by means of pressing-in without significant efforts (e.g., by hand) until the surface 344 of the bearing 300 comes into contact with the shoulder 203 and/or the tab 312 slides into the slot 216; and
the retaining ring 503 may be disposed to fit into the radial groove 205.

The resultant assembly (e.g., 600 in FIG. 6B) may offer a sufficiently strong formed joint without necessitating of machining pulley housing inside surface, use of mechanical fasteners and/or other attachment parts.

In order to facilitate installation of the SLB 300 into the bearing housing 200 and obtain fit, a proper clearance is considered. In some applications where in the SLB and the bearing housings are fabricated from plastic materials, e.g., including these described herein, the inside diameter the inner cavity of the bearing housing (246 in FIG. 2B) may be selected at 47 mm for the SLB outer diameter (336 in FIG. 3B) of 47 mm.

In order to facilitate installation of the SLB 300 into the axle 510 and obtain fit, a proper clearance between the axle shaft and SPS work surface is considered. In some implementations, the clearance may be selected between 0.15 mm and 0.25 mm. By way of an illustration, for a 20 mm axle diameter, bearing inner diameter 332 (in FIG. 3B) may be selected between 20.15 mm and 20.25 mm to ensure proper clearance during installation of the bearing onto the axle.

Where certain elements of these implementations can be partially or fully implemented using known components, only those portions of such known components that are necessary for an understanding of the present disclosure will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "plastic" is meant generally to denote all types of materials consisting of any of a wide range of synthetic or semi-synthetic organic compounds that are malleable and so can be molded into solid objects.

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed:

1. A bearing protection assembly for use with a radial bearing, the bearing protection assembly including:
   a solid portion having an outer surface characterized by a first outer diameter and an aperture characterized by a first inner diameter; and
   an air-permeable ring having a second outer diameter configured equal the first inner diameter, the ring configured to be disposed inside the aperture;
   wherein:
      the bearing protection assembly is configured to be installed on an axle proximate the bearing;
      the bearing protection assembly is characterized by a bearing-facing side that configured to face the bearing and a distal side; and
      the air-permeable ring is composed of an air-permeable material configured to allow air passage between the distal side and the bearing-facing side.

2. The bearing protection assembly of claim 1, wherein the air-permeable material includes one or more of felt and wool.

3. The bearing protection assembly of claim 2, wherein the air-permeable material is further configured to prevent passage of solid particles with particle dimensions between 1 micrometer and 100 micrometer from the distal side to the bearing facing side.

4. The bearing protection assembly of claim 1, wherein the solid portion is characterized by a first thickness and a second thickness configured smaller than the first thickness.

5. The bearing protection assembly of claim 4, wherein the second thickness is selected from the range between 0.4 and 0.8 of the first thickness.

6. The bearing protection assembly according to claim 1, wherein:
the solid portion includes a slanted chamfer disposed on the bearing facing side and extending outwards such that thickness of the solid portion closer the outer surface is greater than thickness proximate the aperture.

7. The bearing protection assembly of claim 1, wherein:
the bearing protection assembly is configured to be disposed coaxially with the bearing;
the air-permeable ring forms an aperture characterized by a second inner diameter; and
the second inner diameter is configured at least 95% of diameter of the axle.

8. The bearing protection assembly according to claim 7, wherein the air-permeable material is impregnated with a lubricant configured to reduce friction between the axle and the bearing protection assembly.

9. The bearing protection assembly according to claim 1, wherein:
the radial bearing comprises a metal radial bearing including an outer race and an inner race; and
the solid portion includes a slanted chamfer disposed on the bearing facing side and extending outwards such that thickness of the solid portion closer the outer surface is greater than thickness proximate the aperture such that a gap between the bearing protection assembly and the radial bearing proximate surface of the outer race is reduced.

10. The bearing protection assembly according to claim 1, wherein the radial bearing is selected from the list including 204PP, 304PP, 305PP, and 306PP radial bearing.

11. A self-lubricating bearing apparatus, the apparatus characterized by an inward side and an outward side, the apparatus including:
a housing including:
a cylindrical body characterized by an outside diameter and having an inner cylindrical cavity characterized by an inside diameter;
an aperture formed by a shoulder extending inward from a wall of the inner cylindrical cavity around circumference of the cavity, the shoulder disposed proximate the inward side;
a cavity formed in the shoulder and configured to receive a finger;
a radial channel formed along of the wall of the inner cylindrical cavity, the radial channel disposed distant from the inward side; and
a bearing protection assembly including:
a seal body having an outer surface and an inner cylindrical opening characterized by an opening dimension, the seal body configured to be disposed coaxially with the housing;
the finger extending from the outer surface of the seal body and configured to match shape of the cavity, the finger disposed proximate the inward side;
one or more linear grooves formed along a wall of the inner cylindrical opening; and
an air-permeable ring disposed inside the seal body, the ring having an diameter configured no smaller than diameter of the inner aperture;
wherein:
the seal body is configured to be inserted axially into the inner cavity via a press-fit operation, the shoulder is configured to arrest axial movement of the seal body;
an outer diameter of the seal body is configured to match the inside diameter of the cylindrical body such that to form a slide-in fit; and
the cavity and the finger configured to form a keyed joint configured to prevent relative rotation between the seal body and the cylindrical body.

12. The apparatus of claim 11, wherein
the air-permeable ring is composed of an air-permeable material configured to allow air passage between the outward side and the inward side of the bearing apparatus; and
the air-permeable material is selected from felt, synthetic fiber reinforced felt, and felted cloth.

13. The apparatus of claim 11, wherein the seal body is composed of a lubricant impregnated plastic material.

14. The apparatus according to claim 13, wherein: the inner cylindrical opening is configured to receive an axle is configured to rotate within the inner opening and the lubricant-impregnated plastic material is configured to reduce friction between the axle and the seal body.

15. The apparatus of claim 11, wherein:
the cylindrical body is configured to be installed in a cylindrical pipe with pipe inside diameter no greater than the outside diameter;
the cylindrical body includes an outer flange characterized by an outer flange diameter that is greater than the outside diameter; the flange extending outwards in a direction perpendicular to an axis of the cylindrical body; and
the flange is configured to arrest axial movement of the cylindrical body into the pipe.

16. The apparatus of claim 11, wherein the radial channel is configured to receive a retaining ring configured to prevent withdrawal of the seal body out from the inner cavity.

17. The apparatus of claim 11, wherein one or more linear grooves are configured to receive a lubricating substance configured to effectuate self-lubricating operation of the bearing apparatus.

18. The apparatus of claim 11, wherein: the one or more linear grooves is configured to accept an excess of the plastic material during operation of the bearing apparatus.

19. The apparatus according to claim 11, wherein: the seal body is composed of a plastic material including an anti-friction agent from the list consisting of talcum, graphite, and molybdenum disulfide.

20. A housing for a bearing apparatus, the housing including:
a cylindrical body characterized by an outside diameter, the cylindrical body forming an inner cylindrical cavity characterized by an inside diameter, the cylindrical body having a inward side and a distal side;
a shoulder disposed proximate the inward side and extending inward from a wall of the inner cylindrical cavity around circumference of the cavity, the shoulder forming an aperture;

a slot formed in the shoulder and configured to receive a matching key;

a radial channel formed along of the wall of the inner cylindrical cavity, the radial channel disposed distant from the inward side;

wherein:

the housing is configured to receive a bearing seal, the seal being disposed coaxially with the cylindrical body;

the slot and the key are configured to form a keyed joint such that as to prevent relative rotation between the bearing seal and the cylindrical body;

the seal is configured to be inserted axially into the inner cavity via a press-fit operation, the shoulder is configured to arrest axial movement of the seal; and an outer diameter of the seal is configured to match the inside diameter of the cylindrical body to form a slide-in fit.

21. The housing of claim 20, wherein the bearing seal includes:

a seal body having an outer surface and an inner cylindrical opening characterized by an opening dimension, the seal body configured to be disposed coaxially with the housing;

the key extending from the outer surface and configured to match shape of the cavity, the finger disposed proximate the internal side;

one or more linear grooves formed along a wall of the inner cylindrical opening; and an air-permeable ring disposed inside the seal body, the ring having an inner diameter configured no smaller than diameter of the inner aperture;

wherein:

the air-permeable ring is composed of an air-permeable material configured to allow air passage between the outward side and the inward side of the bearing apparatus, the air-permeable material is selected from felt, synthetic fiber reinforced felt, and felted cloth; and the seal body includes a plastic material selected from the list consisting of ultra-high molecular weight polyethylene and nylon.

\* \* \* \* \*